(12) United States Patent
Kojima

(10) Patent No.: US 10,729,234 B2
(45) Date of Patent: Aug. 4, 2020

(54) SLANT-ADJUSTING UNIT AND FURNITURE

(71) Applicant: KOJIMA METAL FITTING CORPORATION, Tokyo (JP)

(72) Inventor: Morio Kojima, Tokyo (JP)

(73) Assignee: KOJIMA METAL FITTING CORPORATION, Tokyo (JP)

( * ) Notice: Subject to any disclaimer, the term of this patent is extended or adjusted under 35 U.S.C. 154(b) by 0 days.

(21) Appl. No.: 16/484,093

(22) PCT Filed: Jan. 18, 2018

(86) PCT No.: PCT/JP2018/001462
§ 371 (c)(1),
(2) Date: Aug. 6, 2019

(87) PCT Pub. No.: WO2018/147035
PCT Pub. Date: Aug. 16, 2018

(65) Prior Publication Data
US 2020/0000217 A1    Jan. 2, 2020

(30) Foreign Application Priority Data

Feb. 10, 2017    (JP) .................................. 2017-022878

(51) Int. Cl.
*A47B 13/00* (2006.01)
*F16B 9/02* (2006.01)
(Continued)

(52) U.S. Cl.
CPC .............. *A47B 13/003* (2013.01); *F16B 9/02* (2013.01); *A47B 2013/006* (2013.01);
(Continued)

(58) Field of Classification Search
CPC . A47B 13/003; A47B 19/06; A47B 2013/006; A47B 2013/028;
(Continued)

(56) References Cited

U.S. PATENT DOCUMENTS 4,277,102 A * 7/1981 Aaras ...................... A47C 1/03
248/118
4,415,136 A * 11/1983 Knoll ...................... F16M 11/14
248/181.2
(Continued)

FOREIGN PATENT DOCUMENTS

FR          2576134 A1    7/1986
JP          S46-21296 Y   7/1971
(Continued)

OTHER PUBLICATIONS

International Search Report for International Application No. PCT/JP2018/001462 dated Apr. 17, 2018 (3 sheets, 2 sheets translation, 5 sheets total).
(Continued)

*Primary Examiner* — Daniel J Rohrhoff
(74) *Attorney, Agent, or Firm* — Kratz, Quintos & Hanson, LLP

(57) ABSTRACT

An object of the present invention is to provide a slant-adjusting unit which is convenient to adjust the slant of the flat plate supported by the legs and furniture having the unit. and a slant-adjusting unit 200, comprising a first spherical plate 210, second spherical plate 220 having an inner curved surface in facing relation to an outer curved surface of the first spherical plate 210, and a third spherical plate 230 having an outer curved surface in facing relation to an inner curved surface of the first spherical plate 210, and furniture 1, comprising a flat plate 100, the slant-adjusting unit 200 connected to any position of the flat plate 100, a column portion 300, and connected to the slant-adjusting unit 200, and the flat plate 100 integrated with the first spherical plate 210 to adjust the slant at will.

5 Claims, 9 Drawing Sheets

(51) Int. Cl.
*F16B 12/48* (2006.01)
*F16C 11/06* (2006.01)

(52) U.S. Cl.
CPC ....... *A47B 2200/0043* (2013.01); *F16B 12/48* (2013.01); *F16C 11/06* (2013.01)

(58) Field of Classification Search
CPC .... A47B 2200/0043; F16B 9/02; F16B 12/48; F16C 11/06
See application file for complete search history.

(56) References Cited

U.S. PATENT DOCUMENTS

| | | | | |
|---|---|---|---|---|
| 4,645,153 | A * | 2/1987 | Granzow | F16M 11/126 248/181.2 |
| 5,398,901 | A * | 3/1995 | Brodmann | A47B 81/06 248/181.1 |
| 9,726,209 | B2 * | 8/2017 | Moller Hansen | A47B 13/021 |
| 10,470,564 | B2 * | 11/2019 | Li | F16M 11/10 |
| 2007/0261608 | A1 * | 11/2007 | Hu | A47B 9/00 108/1 |
| 2016/0286952 | A1 * | 10/2016 | Christian | A47B 13/003 |
| 2017/0188699 | A1 * | 7/2017 | Christian | A47B 13/023 |

FOREIGN PATENT DOCUMENTS

| | | |
|---|---|---|
| JP | S55-8794 A | 1/1980 |
| JP | H03-112039 U | 11/1991 |
| JP | 2000-232917 A | 8/2000 |
| JP | 1309900 S | 9/2007 |

OTHER PUBLICATIONS

Written Opinion of the International Searching Authority for International Application No. PCT/2018/001462 dated Apr. 17, 2018 (3 sheets).

Extended European Search Report for European Patent Application No. 18751224.9 dated May 25, 2020 (8 sheets).

\* cited by examiner

SLANT-ADJUSTING UNIT AND FURNITURE

TECHNICAL FIELD

The present invention relates to furniture, and in particular to furniture using a unit which is convenient to adjust the slant of a flat plate supported by legs of the furniture.

BACKGROUND ART

For example, for placing something thereon, furniture such as a table with a top plate, particularly a flat one, needs height. The height makes it easy to place an object on the top plate and lift the placed object from the top plate. In order to obtain the height, the table is generally structured such that the top plate is supported by legs, and ends of the legs are in contact with the installation surface such as the ground or floor. If the legs is in contact with the installation surface at three points, a plane formed by the three points is determined without fail, so that there are few occurrence of rattling. If the plane formed by the three points is horizontal, the top plate which is usually parallel to the plane is also horizontal. But if the plane is slanted, the top plate is also slanted.

When comparing the table in which three legs are in contact with the installation surface with a table in which four or more legs are in contact with the installation surface, the latter is more prone to rattle than the former. The table in which four or more legs are contact with the installation surface may be provided with an adjuster at each end of the legs for changing the height to be prevented from rattling (cf patent document 1). The table provided with the adjusters is possible to be prevented from rattling by handling any one of the adjusters.

Moreover, the structure of the legs of the table is not limited to the several legs are connected individually to the positions close to side edges of the top plate. For example, it is disclosed the table provided with a leg having the configuration in which balance of the top plate is supported at one point, and branched several ends in contact with the installation surface (cf patent document 2). Even with such the table, some adjusters may be provided as well.

DESCRIPTION OF THE PRIOR ART

Patent Documents

[Patent Document 1] Japanese Unexamined Patent Application Publication No. 2000-232917

[Patent Document 2] Japanese Design Registration No. 1309900

DISCLOSURE OF THE INVENTION

Problems to be Solved by the Invention

If the installation surface is uneven or slanted, for example, if the table provided with the adjusters is installed in an outdoor cobblestone-like or sloped place, it is common practice to change the height of the ends in order to bring the top plate close to horizontal by handling the adjusters. However, it may be required to handle two or more adjusters in order to bring the top plate close to horizontal. If the table has four or more points in contact with the installation surface, it may be required to handle more adjusters in order to bring the top plate close to horizontal. Moreover, it is difficult to determine each appropriate height from the points with one time handling the adjuster even if a level is used together.

Therefore, an object of the present invention is to provide a slant-adjusting unit which is convenient to adjust the slant of the flat plate supported by the legs and furniture having the unit.

Means for Solving the Problem

In order to achieve the above objective, according to the present invention, the claim 1 is directed to a slant-adjusting unit, comprising: a first spherical plate having a flange connected to a member; a second spherical plate having an inner curved surface in facing relation to an outer curved surface of the first spherical plate; a third spherical plate having an outer curved surface in facing relation to an inner curved surface of the first spherical plate; each of the spherical plates including the first, second and third spherical plates having a circular hole at the center thereof in order to receive a shaft portion of a bolt; the first spherical plate, into which the shaft portion of the bolt is inserted, slidably provided between the second spherical plate and the third spherical plate; the first spherical plate being fixed and held by the second spherical plate and the third spherical plate as a result of tightening up each other; and the bolt passing through the first spherical plate, the second spherical plate, and the third spherical plate, being connected to a female screw in a column portion having a shaft pedestal having an end surface in facing relation to an outer curved surface of the second spherical plate.

The claim 2 is directed to a slant-adjusting unit, further comprising: an operating part having a protector covering the circumference of the shaft portion of the bolt and a fixing nut used with the bolt, a pocket portion concavely provided at the center of the protector having surface in facing relation to the second spherical plate, and a lever provided on a side of the protector; and the fixing nut being anchored to the pocket portion and possible to tighten and loosen the respective spherical plates together with the bolt by rotating the lever in a circumferential direction with respect to the shaft portion of the bolt.

The claim 3 is directed to a slant-adjusting unit, further comprising: an operating part having a body portion, a female screw passing through the body portion, and a lever provided on a side of the body portion; and the operating portion being possible to tighten and loosen the respective spherical plates together with the bolt by rotating the lever in a circumferential direction with respect to the shaft portion of the bolt.

The claim 4 is directed to a slant-adjusting unit, further comprising a lubricant being provided between the first spherical plate and the second spherical plate and/or between the first spherical plate and the third spherical plate.

The claim 5 is directed to furniture having a structure in which a flat plate is supported by legs, wherein the improvement comprises: the slant-adjusting unit further comprising the flat plate and the first spherical plate connected to the flat plate at any position; and the flat plate integrated with the first spherical plate to adjust the slant at will.

Effects of the Invention

According to the configuration of claim 1, the slant-adjusting unit in the present invention is possible to adjust the slant of the flange of the sliding first spherical plate at will. The flange retains the desired slant when the first spherical plate is fixed by a fastener. Also, the flange is possible to move around the bolt and the column portion in addition to being possible to adjust the slant.

Also, according to the configuration of claim 2, the slant-adjusting unit in the present invention is possible to loosen or tighten the fastener with small force on so-called principle of leverage while protecting the fastener minimizing the exposure.

Also, according to the configuration of claim 3, the slant-adjusting unit in the present invention is possible to loosen or tighten the fastener with small force on so-called principle of leverage while reducing the number of members and the weight as much as possible.

Also, according to the configuration of claim 4, in the slant-adjusting unit in the present invention, the slant adjustment is realized without any problem by increasing the slidability of the first spherical plate.

Also, according to the configuration of claim 5, the furniture in the present invention is possible to adjust the slant of the flat plate integrated with the first spherical plate at will. The flat plate retains the desired slant when the first spherical plate is fixed by the fastener. Also, the flat plate is possible to move around the column portion in addition to being possible to adjust the slant. Therefore, in the furniture in the present invention, the adjustments to level and orient the flat plate are easy, if a user of the furniture in the present invention desires to make the flat plate horizontal, moving directly the flat plate to adjust the slant of the flat plate in any direction is more intuitively done than adjusting the legs. Furthermore, even in the case of adjusting the slant by using a level together, the flat plate is possible to move while visually checking the level placed on the flat plate. Furthermore, since the user is possible to adjust the flat plate by operating only the slant-adjusting unit, it is expected that the time required for the adjustment be shorter than handling the adjusters provided on the respective legs. Furthermore, since the flat plate is possible to move around, the furniture may be installed without considering the orientation of the flat plate and the legs, and the orientation of the flat plate may be adjusted after the installation.

DESCRIPTION OF EMBODIMENTS

In the present invention, the following embodiments will now be described with reference to the accompanying drawings.

Embodiment 1

Figure 1:
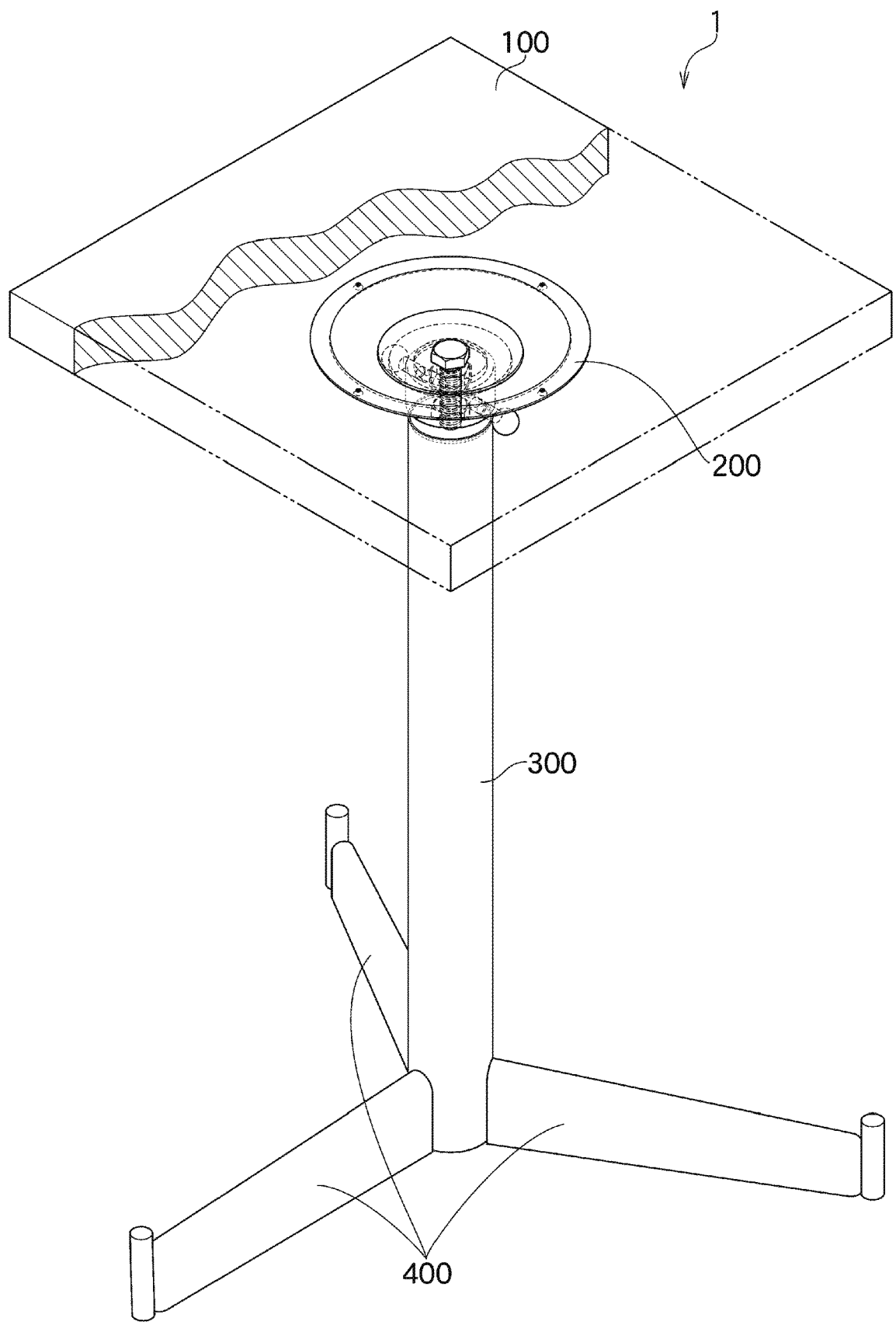
FIG. 1 is a perspective view of the furniture in the present invention as embodiment 1.

FIG. 1 is a perspective view of furniture 1 in the present invention. The furniture 1 in this embodiment comprises a flat plate 100, a slant-adjusting unit 200, a column portion 300 and legs 400.

In this embodiment, the flat plate 100 is a top plate to place an object. In order to place the object on the flat plate 100 without fear of slipping out, the flat plate 100 needs to be horizontal. The slant-adjusting unit 200 is possible to be connected to the flat plate at any position, and to adjust the slant of the flat at will. The slant-adjusting unit 200 in this embodiment is connected to the flat plate 100 such that the central axis of the slant-adjusting unit 200 penetrates the center of gravity of the flat plate 100 so that no deviation occurs. In addition, the flat plate 100 is not limited to the use only which places the object, for example, it may be a premise to make the flat plate 100 slant such as a painting board and a drawing board. The column portion 300 is connected to the slant-adjusting unit 200 and supports the flat plate 100 integrated with the slant-adjusting unit 200. In this embodiment, the legs 400 are extended from a lower part of the column portion 300, and ends of the legs 400 are in contact with the installation surface in order to support the entire furniture 1.

Figure 2:
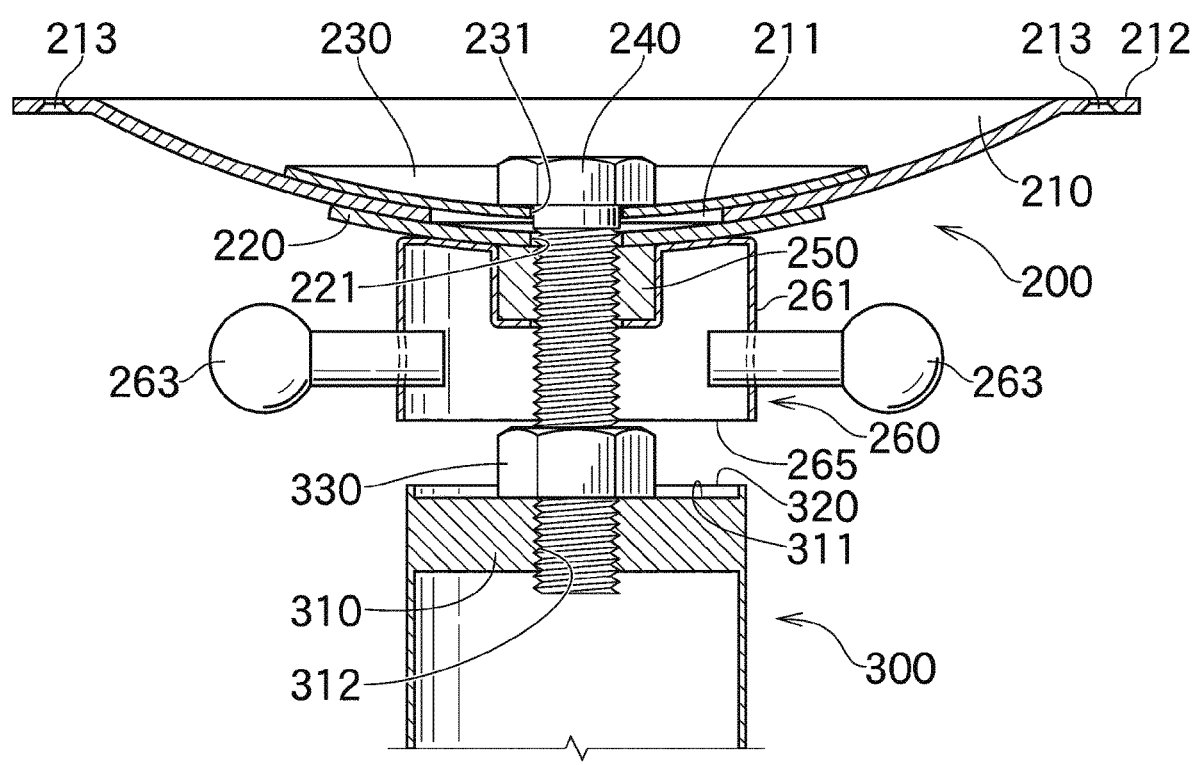
FIG. 2 is a partly broken front view with local section of the slant-adjusting unit and the column portion in the present invention as embodiment 1.
Figure 3:
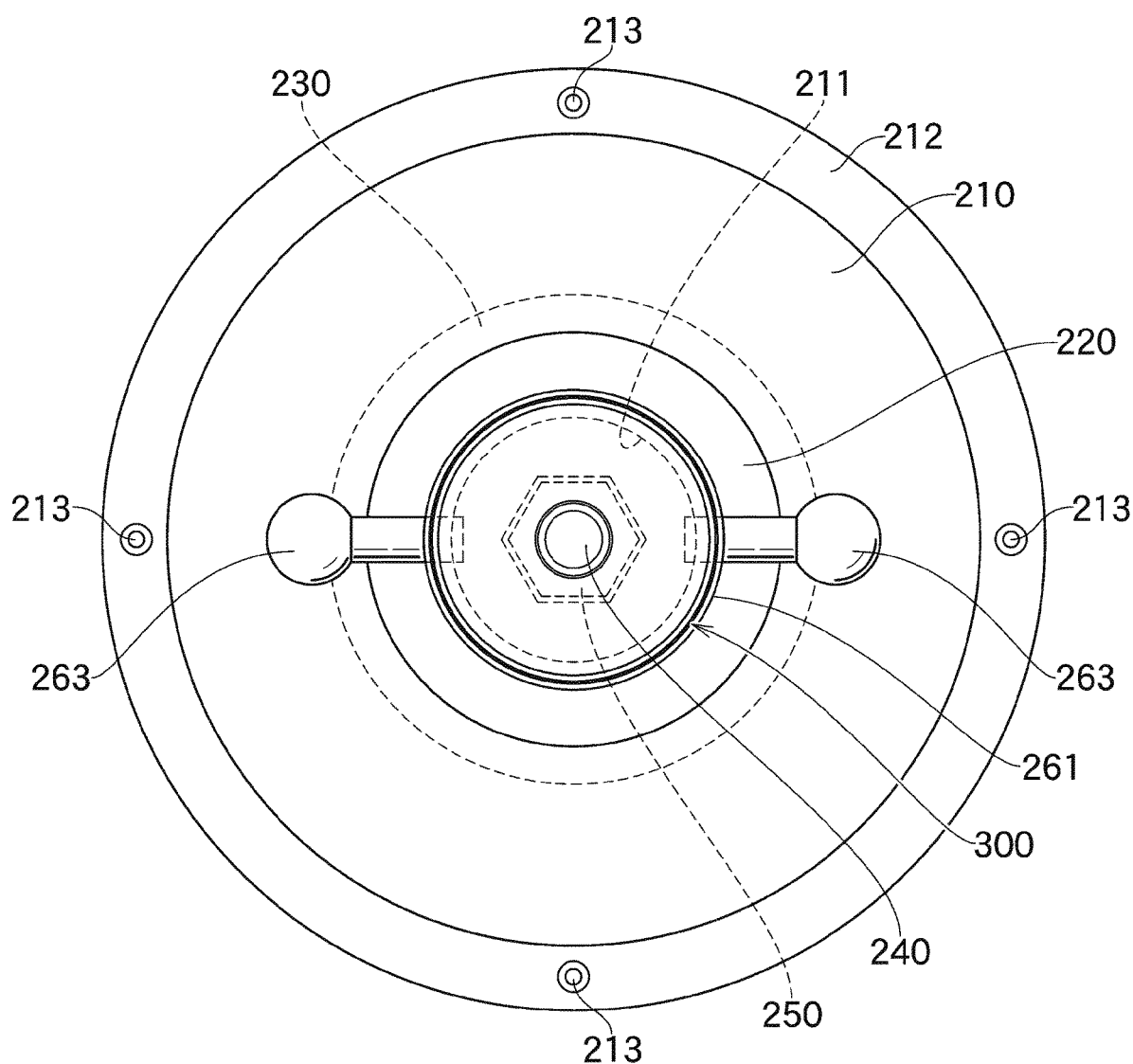
FIG. 3 is a bottom view of the slant-adjusting unit and the column portion in the present invention as embodiment 1.

FIG. 2 and FIG. 3 are a partly broken front view with local section and a bottom view of the slant-adjusting unit 200 and column portion 300. The support portion 300 shows only the vicinity of the portion connected to the slant-adjusting unit 200. The slant-adjusting unit 200 has three spherical plates made of metal. The respective spherical plates are formed into spherical crown for the most part and has spherical inner and outer curved surfaces. The first spherical plate is an adjusting plate 210 slidably provided between the other two spherical plates. The adjustment plate 210 is connected to the flat plate 100. The second spherical plate is a receiving plate 220 having the inner curved surface in facing related to the outer curved surface of the adjusting plate 210. The third spherical plate is a fixing plate 230 having the outer curved surface in facing relation to the inner curved surface of the adjusting plate 210.

The slant-adjusting unit 200 includes a fastener for holding the respective spherical plates. The fastener in this embodiment consists of a bolt 240 and a fixing nut 250. In addition, the respective spherical plates have a circular hole at the center of the respective spherical plates in order to receive the shaft portion of the bolt 240. The diameter of a bolt receiving hole 211 which is the circular hole in the adjustment plate 210 is larger than the diameter of the bolt receiving hole 221 which is the circular hole in the receiving plate 220 and the diameter of the bolt receiving hole 231 which is the circular hole in the fixing plate 230 and smaller than the diameter of a surface corresponding to the bottom of a spherical segment of the support plate 220 and the fixed plate 230. The diameter of the bolt receiving hole 221 in the receiving plate 220 is smaller than the diameter of the fixing nut 250. The diameter of the bolt receiving hole 231 in the fixing plate 230 is smaller than the diameter of the head portion of the bolt 240. Due to the connection with size of these diameters, the adjusting plate 210 inserted the shaft portion of the bolt 240 is possible to slide between the receiving plate 220 and the fixing plate 230 and to be retained between the receiving plate 220 and the fixing plate 230.

The adjusting plate 210 held by the receiving plate 220 and the fixing plate 230 is fixed by tightening the respective spherical plates. Specifically, by tightening the fastener, the receiving plate 220 and the fixing plate 230 are pressed, and the adjusting plate 210 sandwiched by the receiving plate 220 and the fixing plate 230 is fixed. On the other hand, by loosening the fastener, the adjusting plate 210 released from the pressure of the receiving plate 220 and the fixing plate 230 is possible to move. The adjusting plate 210 in this embodiment slides in surface contact with the receiving plate 220 and the fixing plate 230.

The adjustment plate 210 has a flange 212 which is formed annularly. The adjusting plate 210 in this embodiment is possible to place the flat plate 100 on the flange 212. The adjusting plate 210 in this embodiment is provided with a plurality of screw holes 213 in order to fix the flat plate 100 by screwing. The material of the flat plate 100 integrated with the adjusting plate 210 is not limited, and may be wood or metal. Further, the means for fixing the flat plate 100 is not limited to screwing, for another example, may be fixing by welding or fitting. The shape of the mounting surface of the flat plate 100 is not limited to a square, and may be another polygon, circle, or a combination of them.

Figure 4:
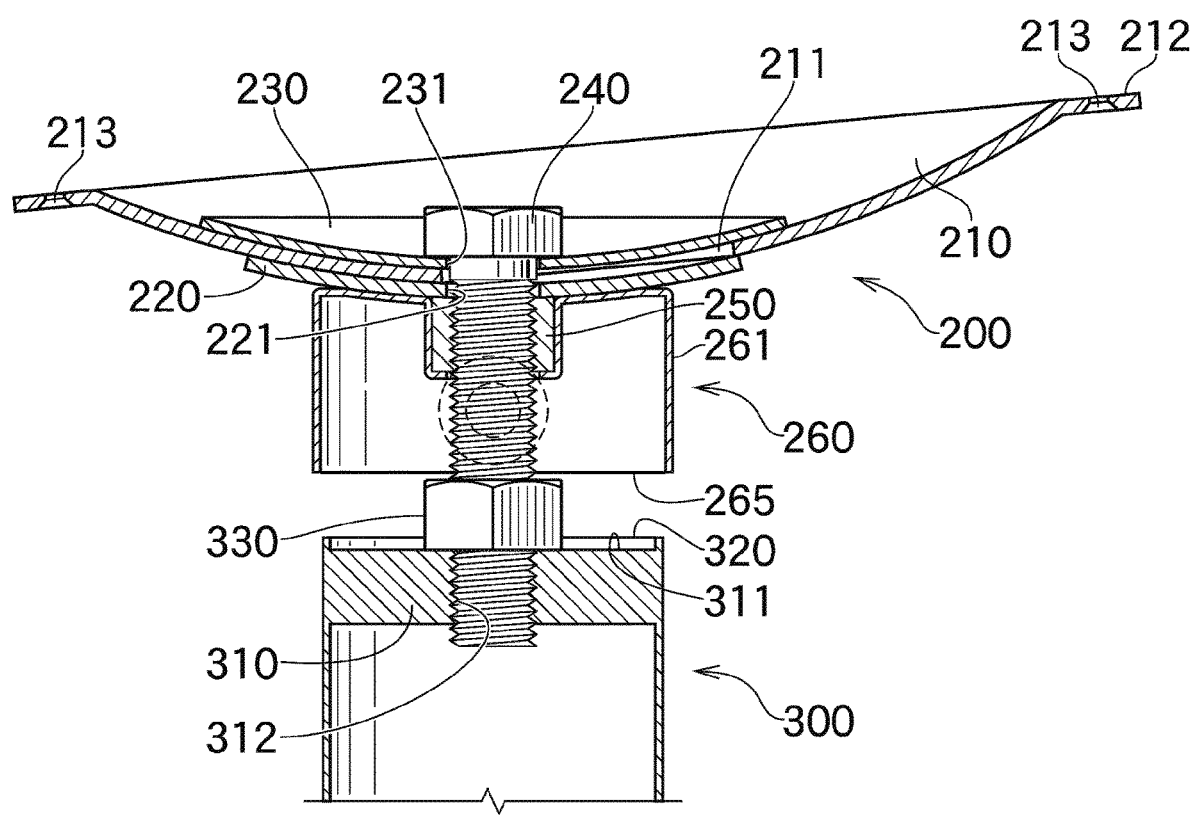
FIG. 4 is a partly broken side view with local section of slanting the first spherical plate of the slant-adjusting unit in the present invention as embodiment 1.

FIG. 4 is a side view with local section of slanting the first spherical plate 210 of the slant-adjusting unit 200. The slant-adjusting unit 200 in the present invention is possible to adjust the slant of the flange 212 of the sliding adjusting plate 210 at will. The flange 212 retains the desired slant when the first spherical plate 210 is fixed by the fastener. Also, the flange 212 is possible to move around the bolt 240 and the column portion 300 in addition to being possible to adjust the slant.

Figure 5:
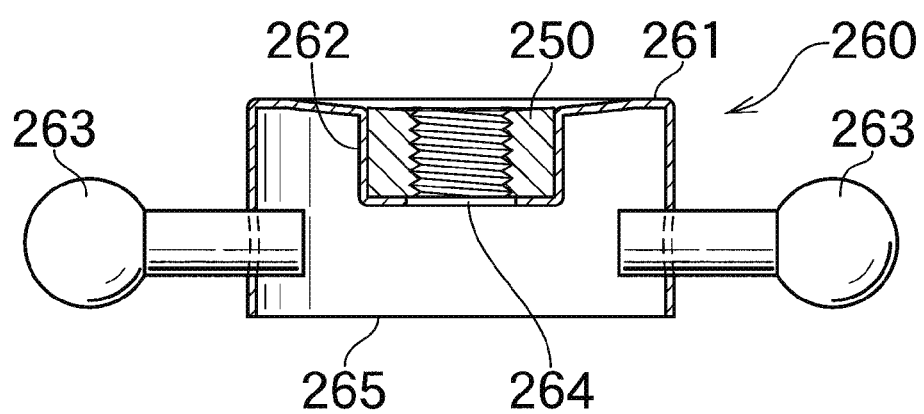
FIG. 5 is a partly broken front view with local section of the operating part of the slant-adjusting unit in the present invention as embodiment 1.

FIG. 5 is a partly broken front view with local section of an operating part 260 of the slant-adjusting unit 200. The slant-adjusting unit 200 includes the operating part 260 for rotating the fixing nut 250. The operating part 260 comprises a protector 261 covering around the fastener, a pocket portion 262 provided concavely provided at the center of the protector 261 having the surface in facing relation to the second spherical plate 220, and a lever 263 provided on a side of the protector 261. In addition, the operating part 260 has a bolt receiving hole 264 at the bottom of the pocket portion 262 in order to receive the shaft portion of the bolt 240. In this embodiment, the surface of the protector 261 in facing relation to the receiving plate 220 is formed spherically.

The fixing nut 250 anchored by fitting to the pocket portion 262 is restricted from rotating and prevented from falling off in the pocket portion 262. The fixing nut 250 may be welded to the pocket portion 262. The fixing nut 250 anchored to the pocket portion 262 is rotated with the protector 261 by operating the lever 263 in a circumferential direction with respect to the shaft portion of the bolt 240, and possible to tighten and loosen each spherical plate together with the bolt 240.

In this embodiment, the slant-adjusting unit 200 is possible to loosen or tighten the fastener composed of the bolt 240 and fixing nut 250 with small force on so-called principle of leverage while protecting the fastener minimizing the exposure.

The bolt 240 is also used to connect the slant-adjusting unit 200 to the column portion 300. The column portion 300 in this embodiment is cylindrical and the interior in the column portion 300 is almost hollow. The column portion 300 is provided with a shaft pedestal 310 to be connected to the bolt 240 at the top of the column portion 300. The end surface 311 of the shaft pedestal 310 faces the slant-adjusting unit 200. The shaft pedestal 310 is provided with a female screw 312 in a central circular hole. The shaft pedestal 310 in this embodiment is formed so as to be located slightly below an outer peripheral upper end portion 320 which is the upper end of the column portion 300. The outer diameter of the outer peripheral upper end portion 320 is smaller than the inner diameter of the outer peripheral lower end portion 265 which is the lower end of the protector 261 of the operating part 260. In this embodiment, the protector 261 is formed with a gap for allowing the insertion of a tool between the outer peripheral lower end portion 265 and the outer peripheral upper end portion 320 of the column portion 300.

The slant-adjusting unit 200 is connected to the column portion 300 by screwing the bolts 240 inserted through the respective spherical plates of the slant-adjusting unit 200 and the female screw 312 of the shaft pedestal 310. In this embodiment, the connection nut 330 is tightened against the end surface 311 in order to prevent the bolt 240 and the female screw 312 from being loosened. The connection nut 330 is tightened or loosened by inserting the tool from the gap between the outer peripheral lower end portion 265 of the slant-adjusting unit 200 and the outer peripheral upper end portion 320 of the column portion 300.

The legs 400 in this embodiment are extended from the lower portion of the column portion 300, but positions connecting the legs 400 to the column portion 300 is optional. The number of the legs 400 is not limited to three, and may be three or more. The material of the column portion 300 and the legs 400 is not limited. For example, wood and metal such as stainless may be used. The interiors of the column portion 300 and the legs 400 may be hollow or solid partially or entirely. The legs 400 may be integrally formed with the column portion 300, or may be separately formed and connected. In this embodiment, the three legs 400 are used and in contact with the installation surface at three points, When the legs 400 are in contact with the installation surface at three points, a plane formed by the three points is determined without fail, so that there are few occurrence of rattling, even so some adjusters may be provided for changing the height of the ends of the legs 400. In the case of four or more legs 400, it is preferable to provide an adjuster in order to be prevented from rattling. The flat plate 100 is preferably adjusted to horizontal without rattling the legs 400.

Figure 6:
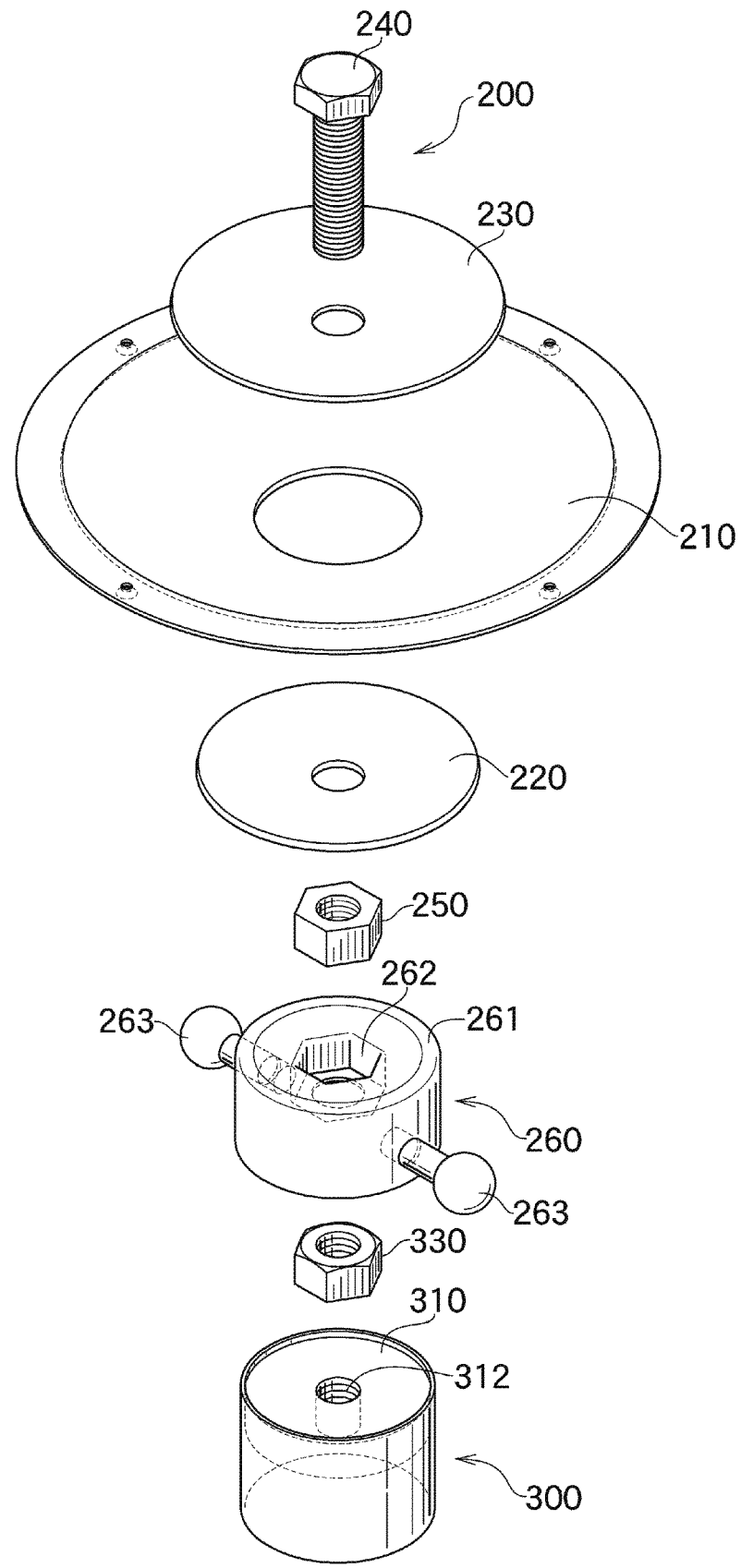
FIG. 6 is a reference perspective view of a mounting process of the slant-adjusting unit at the column portion in the present invention as embodiment 1.

FIG. 6 is a reference perspective view of a mounting process of the slant-adjusting unit 200 at the column portion 300 in this embodiment. First, the connection nut 330 is placed at the center of the end surface 311 of the shaft pedestal 310 fitting to the female screw 312 of the column portion 300, and the protector 261 in which the fixing nut 250 is anchored to the pocket 262 is covered on the column portion 300. Subsequently, the receiving plate 220, the adjusting plate 210 and the fixing plate 230 are sequentially mounted on the protector 261, screwed in through the bolt 240 up to the female screw 312, and tightened with the connection nut 330 in order to be prevented from loosening. At this moment, the head of the bolt 240 may be welded to the fixing plate 230.

As the bolt 240, the fixing nut 250, and the connection nut 330 in this embodiment, generic distributed products may be adopted. At this moment, the surface of the head of the bolt 240 in facing relation to the fixing plate 230 and the surface of the fixing nut 250 in facing relation to the receiving plate 220 may be formed spherically. In addition, when the surface of the head of bolt 240 in facing relation to the fixing plate 230 and the surface of the fixing nut 250 in facing relation to the receiving plate 220 are flat, the portion at which the bolt 240 is contact with the inner curved surface of the fixing plate 230 and the portion at which the fixing nut 250 is in contact with the outer curved surface of the receiving plate 220 may be formed flat.

An example of the procedure for leveling the flat plate 100 after installing the furniture is shown below. First, a user rotates the lever 263 and loosens the fixing nut 250. By loosening the fixing nut 250, the adjusting plate 210 is possible to slide between the receiving plate 220 and the fixing plate 230. The user adjusts the flat plate 100 integrated with the adjustment plate 210 horizontally, then rotates the lever 263 in reverse, firmly tightens the fixing nut 250, and fixes the adjustment plate 210 while making the flat plate 100 horizontal.

Embodiment 2

Figure 7:
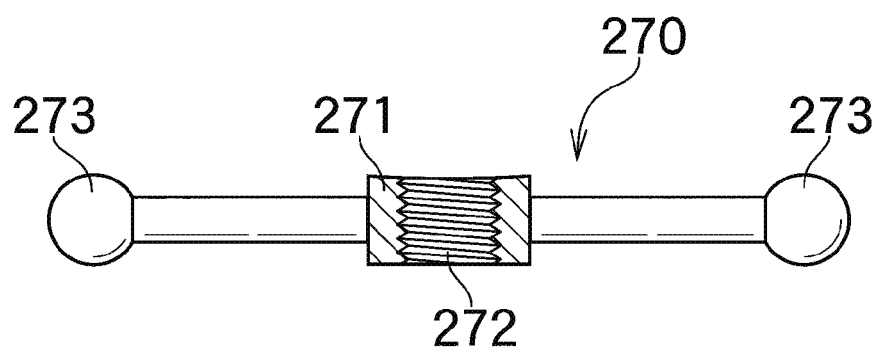
FIG. 7 is a partly broken front view with local section of the operating part of the slant-adjusting unit in the present invention as embodiment 2.

In the present embodiment, a modified example of the slant-adjusting unit 200 of the present invention will now be described. FIG. 7 is a partly broken front view with local section of a modified operating part 270 of the slant-adjusting unit 200. In the configuration in this embodiment, the protector 261 in the embodiment 1 is leaved out.

In this embodiment, the operating part 270 has a body portion 271 and a female screw 272 passing through the body portion 271, and the surface of the body portion 271 in facing relation to the receiving plate 220 is formed spherically. The operating part 270 also has a lever 273 provided on a side surface of the body portion 271. The lever 273 may be adhered or screwed to the body portion 271.

The body portion 271 and the female screw 272 work as a fastener in order to fix the respective spherical plates together with the bolt 240. Specifically, by moving the lever 273 around the shaft portion of the bolt 240, the operating part 270 is possible to tighten and loosen the respective spherical plates together with the bolt 240. The operating part 270 is replaced to the fixing nut 250 and the operating part 260 in the embodiment 1, so that the other member is the same as that of the embodiment 1 and thus, the description of the members is omitted.

In this embodiment, the slant-adjusting unit 200 is possible to loosen or tighten the fastener composed of the bolt 240 and the operating part 270 with small force on so-called principle of leverage while reducing the number of members and the weight as much as possible.

Embodiment 3

Figure 8:
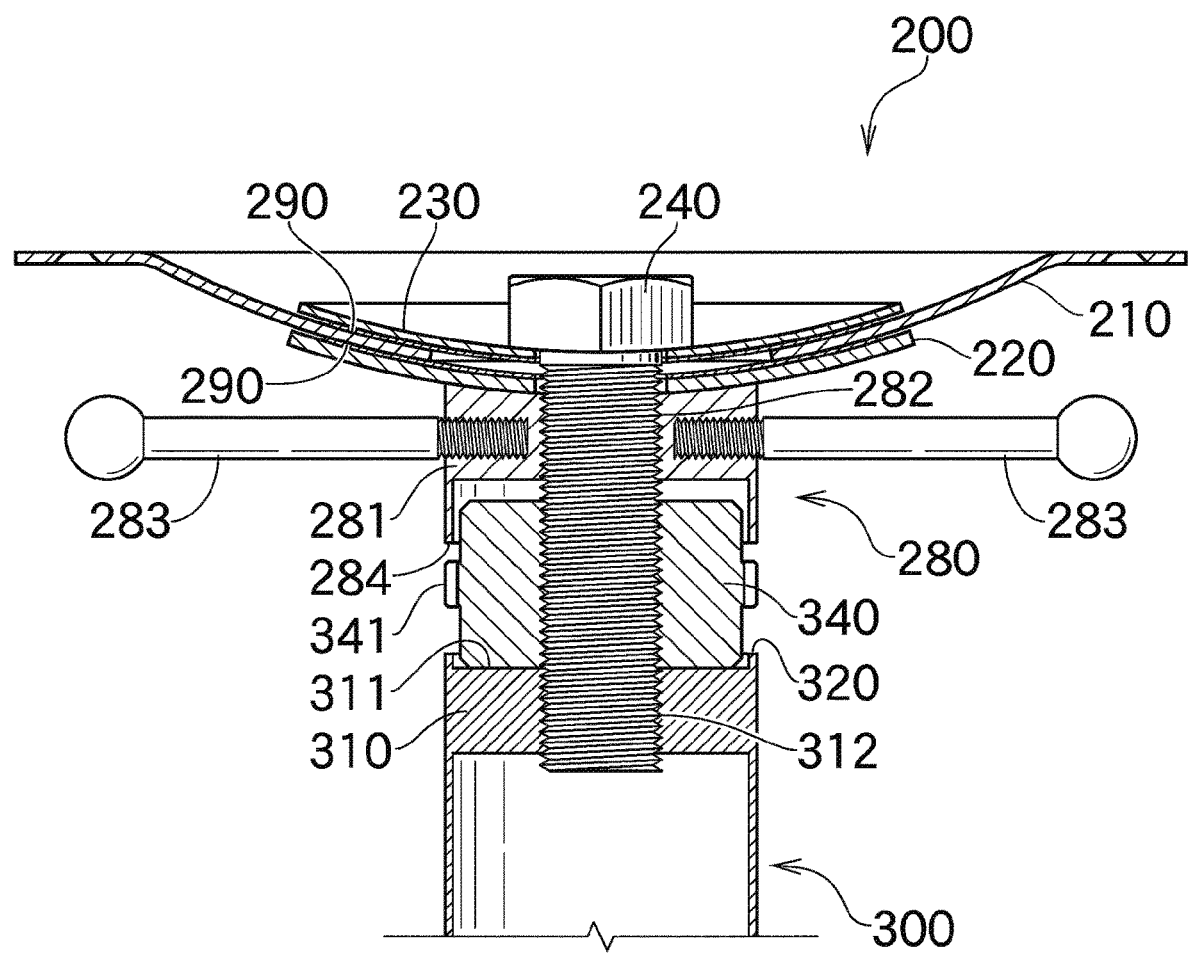
FIG. 8 is a partly broken front view with local section of the slant-adjusting unit and the column portion in the present invention as embodiment 3.

In the present embodiment, another modified example of the slant-adjusting unit 200 of the present invention will now be described. FIG. 8 is a partly broken front view with local section of the slant-adjusting unit 200 and the column portion 300. In this embodiment, it is easy to tighten up in order to prevent the bolt 240 and the female screw 312 from being loosened by increasing the slidability of the respective spherical plates.

In this embodiment, the operating part 280 has a body portion 281 and a female screw 282 passing through the body portion 281, and the surface of the body portion 281 in facing relation to the receiving plate 220 is formed spherically. The operating part 280 also has a lever 283 provided on a side surface of the body portion 281. In this embodiment, the lever 283 is screwed to the operating part 280. Further, the lower portion of the body portion 281 is formed so as to cover the upper portion of the connection nut 340, and an outer peripheral lower end portion 284 which is the lower end of the body portion 281 is formed with a gap into the outer peripheral upper end portion 320 of the column portion 300. The lower portion of the body portion 281 and the upper portion of the column portion 300 protect the upper and lower portion of the connection nut 340.

The body portion 281 and the female screw 282 work as a fastener in order to fix the respective spherical plates together with the bolt 240. Specifically, by moving the lever 283 around the shaft portion of the bolt 240, the operating part 280 is possible to tighten and loosen the respective spherical plates together with the bolt 240.

In this embodiment, a lubricant is provided between the adjusting plate 210 and the receiving plate 220 and between the adjusting plate 210 and the fixing plate 230. The lubricant 290 is almost spherical crown-shaped like the respective spherical plates, and has a circular hole for receiving the bolt 240. As a suitable material of the lubricating 290, resin and brass which have high slidability are available for example. The lubricant 290 may be a sheet-like member containing lubricant, or may be a coating agent applied to the outer curved surface and the curved surface of the respective spherical plates.

In this embodiment, the slant adjustment is realized without any problem by increasing the slidability of the adjusting plate 210. If sufficient slidability is obtained by processing the outer curved surface and the inner curved surface of the respective spherical plates, the slant-adjusting unit 200 may be provided with the lubricant 290 only between one and the other, or, it is not necessary to use the lubricant 290 at all.

The connection nut 340 in this embodiment has a protrusion 341 provided on a side surface thereof, and the protrusion 341 has unevennesses at regular intervals. The connection nut 340 is formed such that the outermost periphery of the protrusion 341 has substantially the same diameter as the outer periphery of the column portion 300. The connection nut 340 in this embodiment is excellent in visibility, so that it is easy to grasp and rotate the connection nut 340.

Figure 9:
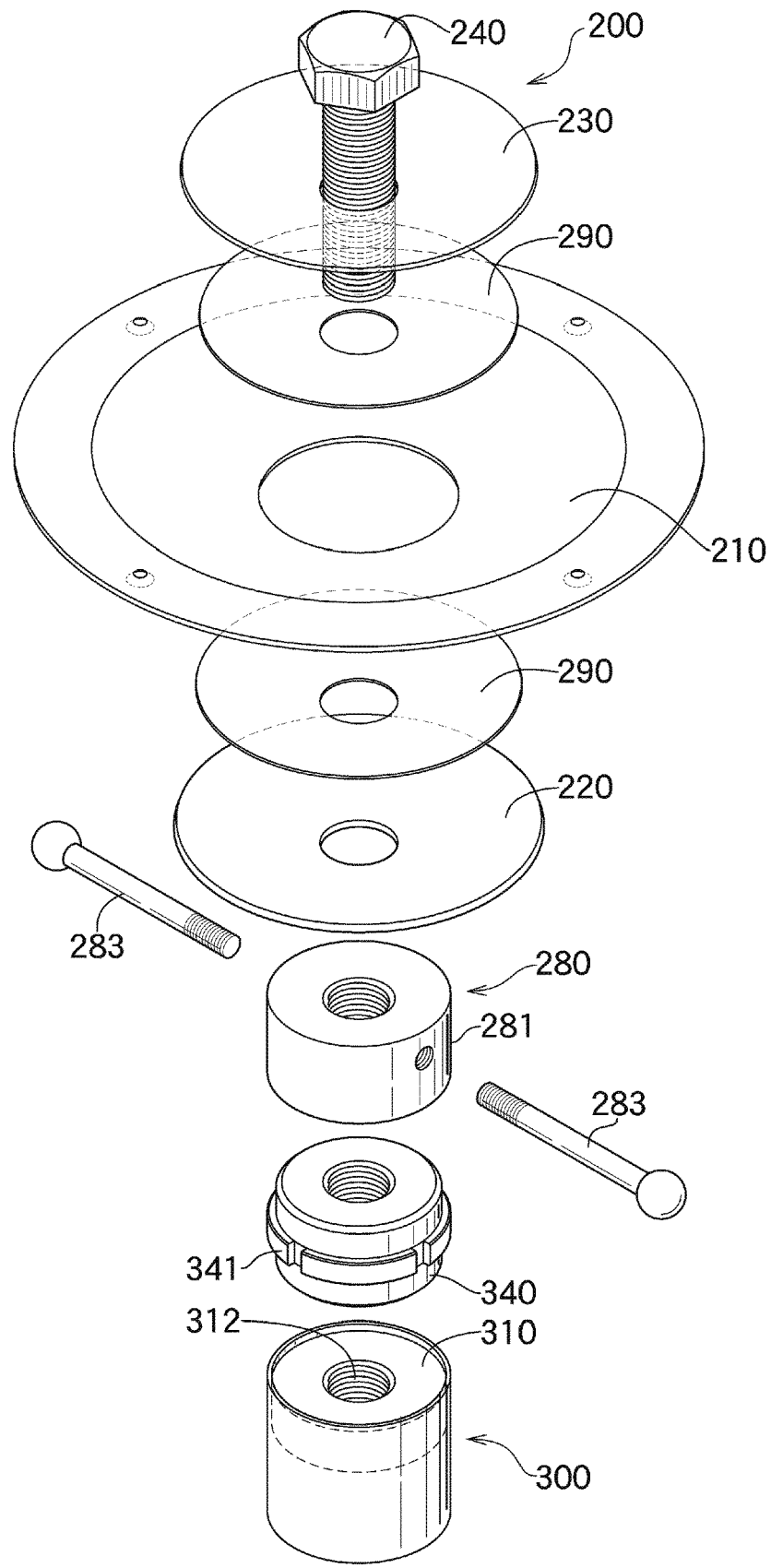
FIG. 9 is a reference perspective view of a mounting process of the slant-adjusting unit at the column portion in the present invention as embodiment 3.

FIG. 9 is a reference perspective view of a mounting process of the slant-adjusting unit 200 at the column portion 300 in this embodiment. First, the connection nut 340 is placed at the center of the end surface 311 of the shaft pedestal 310 fitted to the female screw 312 of the column portion 300, so the body portion 281 of the operating part 280 is covered on the connection nut 340. In this case, providing the lever 283 on the body portion 281 may be performed at any stage of the mounting process. Subsequently, the receiving plate 220, the lubricant 290, the adjusting plate 210, the lubricant 290 and the fixing plate 230 are sequentially mounted on the body portion 281, screwed in through the bolt 240 up to the female screw 312, and tightened with the connection nut 340 in order to be prevented from loosening. The members of such as the respective spherical plates, the bolt 240 and the other member are same as the configurations in the embodiment 1, so that the description of the members is omitted.

In all embodiments described as mentioned above, the user is possible to adjust the slant of the flat plate 100 integrated with the adjustment plate 210 at will. The flat plate 100 retains the desired slant when the adjusting plate 210 is fixed by the fastener. Also, the flat plate 100 is possible to move around the column portion in addition to being possible to adjust the slant. Therefore, in the furniture 1 in the present invention, the adjustments to level and orient the flat plate 100 are easy. If the user of the furniture 1 in the present invention desires to make the flat plate 100 horizontal, moving directly the flat plate 100 to adjust the slant of the flat plate 100 in any direction is more intuitively done than adjusting the legs 400. Furthermore, even in the case of adjusting the slant by using a level together, the flat plate 100 is possible to move while visually checking the level placed on the flat plate 100. Furthermore, since the user is possible to adjust the flat plate 100 by operating only the slant-adjusting unit 200, it is expected that the time required for the adjustment be shorter than handling the adjusters provided on the respective legs 400. Furthermore, since the flat plate 100 is possible to move around, the furniture 1 may be installed without considering the orientation of the flat plate 100 and the legs 400, and the orientation of the flat plate 100 may be adjusted after the installation.

The furniture 1 in the present invention may not necessarily be provided with the legs 400, and the lower portion of the column portion 300 may be fixed to the installation surface. In the case of this configuration, the installation surface may not be the ground or the floor. For example, a television monitor instead of the flat plate 100 may be installed on a vertical wall. The slant-adjusting unit 200 may be also used as a signboard by connecting the flat plate 100 to the flange 212 of the adjustment plate 210 as if propped up against the flange 212, and members of other shapes, for example, cone-shaped member may be also connected to the flange 212. Specifically, the slant-adjusting unit 200 may be also possible to place the member such as a working stand or a solar panel to the flange 212 of the adjustment plate 210.

DESCRIPTION OF THE REFERENCE NUMERALS

1 . . . furniture.
100 . . . a flat plate.
200 . . . a slant-adjusting unit, 210 . . . an adjusting plate, 211 . . . a bolt receiving hole, 212 . . . a flange, 213 . . . a screw hole, 220 . . . a receiving plate, 221 . . . a bolt receiving hole, 230 . . . a fixing plate, 231 a bolt receiving hole, 240 . . . a bolt, 250 . . . a fixing nut, 260 . . . an operating part, 261 . . . a protector, 262 . . . a pocket portion, 263 . . . a lever, 264 . . . a bolt receiving hole, 265 . . . an outer peripheral lower end portion, 270 an operating part, 271 . . . a body portion, 272 . . . a female screw, 273 . . . a lever, 280 . . . an operating part, 281 . . . a body portion, 282 . . . a female screw, 283 . . . a lever, 284 . . . an outer peripheral lower end portion, 290 . . . a lubricant.
300 . . . a column portion, 310 . . . a shaft pedestal, 311 . . . an end surface, 312 . . . a female screw, 320 . . . an outer peripheral upper end portion, 330 . . . a connection nut, 340 . . . a connection nut, 341 . . . a protrusion.
400 . . . legs.

The invention claimed is:
1. A slant-adjusting unit (200), comprising:
a first spherical plate (210) having a flange (212) connected to a member (100);
a second spherical plate (220) having an inner curved surface in facing relation to an outer curved surface of the first spherical plate (210);
a third spherical plate (230) having an outer curved surface in facing relation to an inner curved surface of the first spherical plate (210);
   each of the spherical plates including the first, second and third spherical plates having a circular hole (211, 221 or 231) at the center thereof in order to receive a shaft portion of a bolt (240);
   the first spherical plate (210), into which the shaft portion of the bolt (240) is inserted, slidably provided between the second spherical plate (220) and the third spherical plate (230);
the first spherical plate (210) being fixed and held by the second spherical plate (220) and the third spherical plate (230) as a result of tightening up each other;
   and the bolt (240) passing through the first spherical plate (210), the second spherical plate (220), and the third spherical plate (230), being connected to a female screw (312) in a column portion (300) having a shaft pedestal (310) having an end surface in facing relation to an outer curved surface of the second spherical plate (220).

2. The slant-adjusting unit (200) according to claim 1, further comprising:
   an operating part (260) having a protector (261) covering the circumference of the shaft portion of the bolt (240) and a fixing nut (250) used with the bolt (240), a pocket portion (262) concavely provided at the center of the protector (261) having surface in facing relation to the second spherical plate (220), and a lever (263) provided on a side of the protector (261);
   and the fixing nut (250) being anchored to the pocket portion (262) and possible to tighten and loosen the respective spherical plates together with the bolt (240) by rotating the lever (263) in a circumferential direction with respect to the shaft portion of the bolt (240).

3. The slant-adjusting unit (200) according to claim 1, further comprising:
   an operating part (270 or 280) having a body portion (271 or 281), a female screw (272 or 282) passing through the body portion (271 or 281), and a lever (273 or 283) provided on a side of the body portion (271 or 281);
   and the operating portion (270 or 280) being possible to tighten and loosen the respective spherical plates together with the bolt (240) by rotating the lever (273 or 283) in a circumferential direction with respect to the shaft portion of the bolt (240).

4. The slant-adjusting unit (200) as in claim 1, further comprising a lubricant (290) being provided at at least one of: (a) between the first spherical plate (210) and the second spherical plate (220) and (b) between the first spherical plate (210) and the third spherical plate (230).

5. Furniture (1) having a structure in which a flat plate (100) is supported by legs (400), wherein the improvement comprises:
   the slant-adjusting unit (200) as in claim 1, further comprising the flat plate (100) and the first spherical plate (210) connected to the flat plate (100) at any position;
   and the flat plate (100) integrated with the first spherical plate (210) to adjust the slant at will.

* * * * *